United States Patent [19]
Morgan

[11] 3,932,579
[45] Jan. 13, 1976

[54] RECOVERY OF RHENIUM
[75] Inventor: Kenneth A. Morgan, Hoffman Estates, Ill.
[73] Assignee: Universal Oil Products Company, Des Plaines, Ill.
[22] Filed: Dec. 6, 1973
[21] Appl. No.: 422,500

[52] U.S. Cl. .................... 423/49; 423/54; 423/139; 75/101 BE; 252/413; 252/414
[51] Int. Cl.² .......................................... C01G 47/00
[58] Field of Search ............ 423/49, 54, 139, 658.5; 75/101 BE; 252/414, 413

[56] References Cited
UNITED STATES PATENTS

| | | | |
|---|---|---|---|
| 3,458,277 | 7/1969 | Platzke et al. | 423/54 |
| 3,578,395 | 5/1971 | Kluksdahl et al. | 252/413 |
| 3,672,874 | 6/1972 | Wiley | 75/101 BE |
| 3,681,016 | 8/1972 | Litz | 423/54 |
| 3,855,385 | 12/1974 | Derosset et al. | 423/49 |

OTHER PUBLICATIONS

Kertes et al., "Journal of Chemical Soc.," Vol. 5, 1961, pp. 1921–1925.

Primary Examiner—Herbert T. Carter
Attorney, Agent, or Firm—James R. Hoatson, Jr.; Robert W. Welch; William H. Page, II

[57] ABSTRACT

Rhenium is recovered in a substantially pure form from a hydrochloric acid solution thereof contaminated with molybdenum and iron by adding sulfuric acid to establish a sulfate/chloride anion ratio of at least 20:1 and mixing the solution with a liquid trialkyl phosphate to extract rhenium in the phosphate phase. The trialkyl phosphate phase is seaprated and washed with sulfuric acid to remove any residual iron and molybdenum and thereafter with hydrochloric acid to remove entrained sulfuric acid. Rhenium is recovered by back extracting with nitric acid.

5 Claims, No Drawings

RECOVERY OF RHENIUM

The present invention relates to the recovery of rhenium from a spent catalyst comprising rhenium in combination with a platinum group metal component on an alumina support or carrier material.

A variety of commercially important hydrocarbon conversion processes involving cyclization, dehydrocyclization, isomerization, aromatization, hydrogenation, dehydrogenation, etc., of hydrocarbons has heretofore been effectively catalyzed at varied conditions by catalysts consisting essentially of a platinum group metal composited with a refractory inorganic oxide carrier material. More recently, a rhenium component has been included in the catalyst to form a two component catalyst of improved activity, selectivity and/or stability with respect to one or more of the hydrocarbon conversion reactions.

The catalyst so employed invariably becomes deactivated and regeneration is required if the catalyst is to perform its intended function in an economical manner. Deactivation may result from any one of a number of conditions peculiar to a particular hydrocarbon conversion process. Usually, deactivation results from an excessive deposition of carbonaceous matter whereby the hydrocarbon being processed is denied access to the active sites of the catalyst composite, and from the poisoning influence of certain metal impurities deposited on the catalyst from the hydrocarbon feed stock. While the catalyst may be regenerated with the removal of carbonaceous matter by air oxidation, each such regeneration produces a catalyst somewhat less stable than its predecessor, largely because of the accumulation of the metal impurities. Eventually, regeneration is no longer economically feasible and the spent catalyst must be replaced with a fresh catalyst. The high cost of rhenium and of the platinum group metals, coupled with limited availability, precludes a disposition of the spent catalyst without effecting recovery of substantially all of the rhenium and platinum group metals. This is so although each of the rhenium and platinum group metals may comprise as little as 0.1 wt. % of the total catalyst composite.

Although the description of the method of this invention is presented with reference to the more commonly encountered platinum-containing catalyst, it is understood that the method can be advantageously applied to recover rhenium from other platinum group metal-containing catalysts, for example those containing rhenium in combination with palladium, iridium, osmium, rhodium, ruthenium, and the like. Further, the spent catalysts herein contemplated are generally alumina-based catalysts and the subsequent description of the invention is directed thereto. However, it is again understood that rhenium can be similarly recovered from spent catalysts comprising other refractory inorganic oxide carrier materials including silica, zirconia, thoria, boria, alumina-silica, alumina-zirconia, alumina-boria, and the like. It is common practice to recover the platinum group metal component by initially treating the spent catalyst with sulfuric acid whereby the alumina support or carrier material is digested leaving a platinum group metal-containing residue and an alum or aluminum sulfate solution. Preferably, although not necessarily, the spent catalyst is burned free of carbonaceous matter prior to the acid treatment. When, as is most often the case, the platinum group metal is platinum, it is generally preferred to recover the platinum as chloroplatinic acid to facilitate handling, storage, and subsequent reuse in the manufacture of fresh catalyst. Thus, the platinum is recovered from the carbon-free residue on treating the residue with aqua regia. The resulting mixture is subjected to filtration and the filtrate boiled down to remove solvent and yield a chloroplatinic acid concentrate. When, as herein contemplated, the catalyst further contains a rhenium component, substantially all of the rhenium is found in a soluble form in the alum solution. U.S. Pat. No. 3,672,874 describes an efficient and economical method of recovering rhenium from the alum solution, the rhenium being extracted from the alum solution utilizing an ion exchange resin. The adsorbed rhenium is then recovered from the exchange resin by elution, typically with hydrochloric acid. While the method is useful to recover substantially all of the rhenium, the resulting hydrochloric acid is invariably contaminated with metal impurities, principally molybdenum and iron, which inhibit the reuse of the rhenium in the manufacture of fresh catalyst.

It is therefore an object of this invention to present a novel process for the recovery of rhenium from an iron and molybdenum containing hydrochloric acid solution thereof, and in one of its broad aspects, the present invention embodies a process which comprises adding sufficient sulfuric acid to the solution to establish a sulfate-chloride anion ratio therein of at least about 20:1; admixing the resulting solution with a normally liquid, substantially water insoluble trialkyl phosphate and recovering the rhenium in the trialkyl phosphate phase of the mixture; separating and washing the trialkyl phosphate phase with sulfuric acid for the removal of any residual iron and molybdenum contained therein, and thereafter with hydrochloric acid for the removal of residual sulfuric acid; separating the washed trialkyl phosphate and back extracting the same with from about 6 to about 11 normal nitric acid, and recovering the rhenium therein as a nitric acid solution of perrhenic acid.

Other objects and embodiments of this invention will become apparent in the following detailed specification.

In accordance with the process of the present invention, sufficient sulfuric acid is added to the rhenium-containing hydrochloric acid solution to establish a sulfate/chloride anion ratio therein of at least about 20:1. It is a preferred practice to lower the hydrochloric acid concentration of the solution to less than about 0.5 molar prior to dilution with the sulfuric acid. Substantially all of the hydrochloric acid is separable by simple distillation. Preferably, sufficient sulfuric acid is added to the solution to establish a sulfate/chloride anion ratio of from about 20:1 to about 30:1 or more with ratios in the higher range being increasingly more conducive to the separation of rhenium free of iron and molybdenum. About a 1 molar sulfuric acid solution is suitably employed.

Tributyl phosphate, commonly employed in the solvent extraction of metal ions, is a preferred normally liquid trialkyl phosphate for use herein. Other suitable trialkyl phosphates comprise alkyl groups of up to about 6 carbon atoms, for example, triethyl phosphate, tripropyl phosphate, triisopropyl phosphate, triisobutyl phosphate, tripentyl phosphate, tri(1-methylbutyl) phosphate, tri(2-methylbutyl) phosphate, tri(3-methylbutyl) phosphate, tri-n-hexyl phosphate, tri(1-methylpentyl) phosphate, tri(2-methylpentyl) phosphate, tri(3-methylpentyl) phosphate, tri(4-methylpentyl) phosphate, and the like. One volume of the sulfuric acid solution is effectively extracted with from about ⅛ to about ¼ volume of the selected trialkyl phosphate.

The trialkyl phosphate extract will contain substantially all of the rhenium and at least traces of the molybdenum and iron contaminants. Therefore, prior to back extracting or stripping rhenium from the trialkyl phosphate extract, the extract is washed with sulfuric acid -- suitably about 1 to about 2 molar sulfuric acid -- for the separation of residual molybdenum and iron contained therein. The sulfuric acid wash is followed by a hydrochloric acid wash -- suitably from about 4 to about 8 molar hydrochloric acid -- for the removal of any entrained sulfuric acid.

Back extraction or stripping of the rhenium from the trialkyl phosphate extract is accomplished with about 11 normal nitric acid or less, and the rhenium is recovered as perrhenic acid in nitric acid solution. The efficient separation and recovery of rhenium from the trialkyl phosphate extract utilizing in excess of 11 normal nitric acid is precluded in view of the increased solubility of the trialkyl phosphates, particularly the preferred tributyl phosphate, at the higher nitric acid concentrations. Preferably, the trialkyl phosphate extract is back extracted or stripped of rhenium with from about 6 to about 11 normal nitric acid. Nitric acid is readily distilled from the perrhenic acid, the latter being a particularly useful form of rhenium for use in the manufacture of fresh catalyst.

Solvent extraction in accordance with the process of this invention can be effected in a batch type of operation although a continuous type of operation is preferable. It is contemplated that in normal operations the liquid solutions would be contacted under extraction conditions in any one of a number of contacting devices known to the art. Contacting devices which can be utilized in a continuous operation include the rotating disc contactor, and also countercurrent extractor columns containing spaced trays or plates, or inert packings such as beryl saddles, to promote intimate contact of the reactant streams.

The following example is presented in illustration of the process of this invention and is not intended as an undue limitation on the generally broad scope of the invention as set out in the appended claims.

EXAMPLE

An acidic solution 2 molar in HCl and 3 molar in $H_2SO_4$, and containing 8 grams of rhenium, 1 gram of molybdenum, .3 grams of iron and .3 grams of aluminum, is diluted to about 1250 milliliters with 1 molar $H_2SO_4$, and the diluted solution extracted once with about 350 milliliters of tributyl phosphate. The tributyl phosphate extract is washed twice with 150 milliliter portions of 2 molar $H_2SO_4$ to remove residual iron and molybdenum, and then twice with about 50 milliliters of 4 molar HCl to remove entrained $H_2SO_4$. The washed tributyl phosphate extract is thereafter stripped or back extracted 3 times with 11 normal $HNO_3$ to remove 99+% of the rhenium as perrhenic acid in nitric acid solution.

I claim as my invention:

1. A process for the recovery of rhenium from an iron and molybdenum-containing hydrochloric acid solution thereof, which comprises:
   a. adding sufficient acid to the solution to establish a sulfate/chloride anion ratio therein of at least about 20:1;
   b. admixing the resulting solution with a normally liquid, substantially water insoluble trialkyl phosphate and recovering the rhenium in the trialkyl phosphate phase of the mixture;
   c. separating and washing the trialkyl phosphate phase with sulfuric acid for the removal of any residual iron and molybdenum contained therein, and thereafter with hydrochloric acid for the removal of entrained sulfuric acid;
   d. separating the washed trialkyl phosphate and back extracting the same with from about 6 to about 11 normal nitric acid, and recovering the rhenium therein as a nitric acid solution of perrhenic acid.

2. The process of claim 1 further characterized in that said trialkyl phosphate is tributyl phosphate.

3. The process of claim 1 further characterized with respect to step (a) in that the hydrochloric acid concentration of said solution is first reduced to less than about 0.5 molar.

4. The process of claim 1 further characterized with respect to step (b) in that said solution is admixed with from about ⅛ to about ½ its volume of said trialkyl phosphate.

5. The process of claim 1 further characterized with respect to step (a) in that sufficient sulfuric acid is added to said solution to establish a sulfate/chloride anion ratio of from about 20:1 to about 30:1 or more.

* * * * *